Oct. 16, 1945.　　　G. JELLINEK　　　2,386,960
AUTOMATIC CHUCK DEVICE
Filed May 6, 1944　　　2 Sheets-Sheet 1

INVENTOR.
GEORGE O. JELLINEK.
BY

Oct. 16, 1945.   G. JELLINEK   2,386,960
AUTOMATIC CHUCK DEVICE
Filed May 6, 1944   2 Sheets-Sheet 2
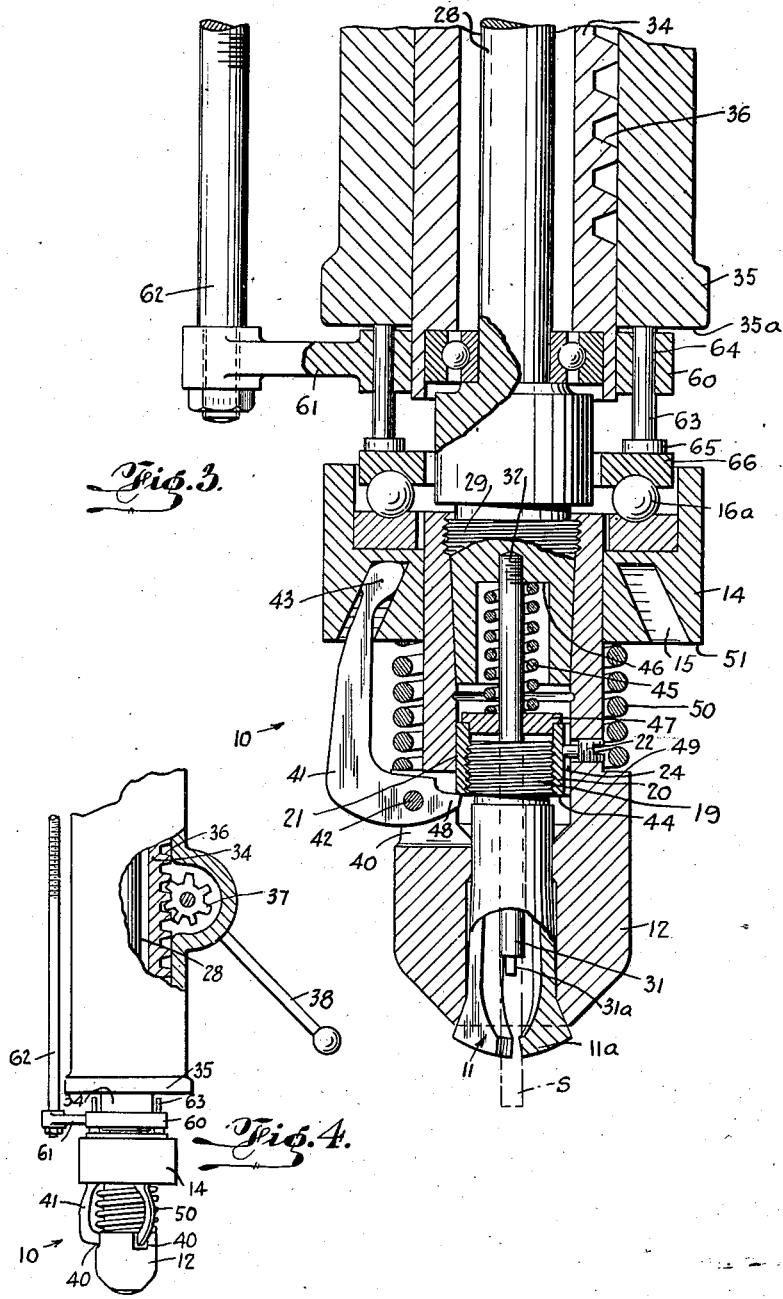
INVENTOR.
GEORGE O. JELLINEK.
BY Leon M. Strauss Patented Oct. 16, 1945

2,386,960

UNITED STATES PATENT OFFICE 2,386,960

AUTOMATIC CHUCK DEVICE

George Jellinek, Plainfield, N. J.

Application May 6, 1944, Serial No. 534,459

8 Claims. (Cl. 279—51)

This invention relates to improvements in chucks for drill presses or cutting machines, and more particularly to the type in which the stock is inserted and discharged from the bottom of the chuck.

It is an object of this invention to provide automatic means for rapidly operating chucks of the aforesaid type to load and discharge the stock to be worked upon.

It is a further object of this invention to provide automatic means which may be readily adjusted to fit various dimensions and types of stock to be worked upon.

It is a still further object of this invention to provide automatic clamp means which securely hold the stock inserted therein without stopping the machine to which the chuck is applied.

Still another object of this invention is to provide means exerting a clamping or closure pressure which is a multiple of the pressure required for opening the chuck.

The foregoing and other objects and features of the invention will become more clearly apparent from the following description, which is descriptive of a preferred embodiment of the invention illustrated in the accompanying drawings. However, the embodiment herein shown and described being for purposes of illustration only, it is to be understood that such modifications may be made when desired, within the scope and spirit of the invention as claimed.

In the drawings:

Fig. 3 is a vertical sectional view of the lower part of a chuck made in accordance with this invention and shown in its inoperative position.

Fig. 4 is a diagrammatic side view of the lower part of a drill press incorporating the invention, parts being shown in section.

Figures 1, 2:
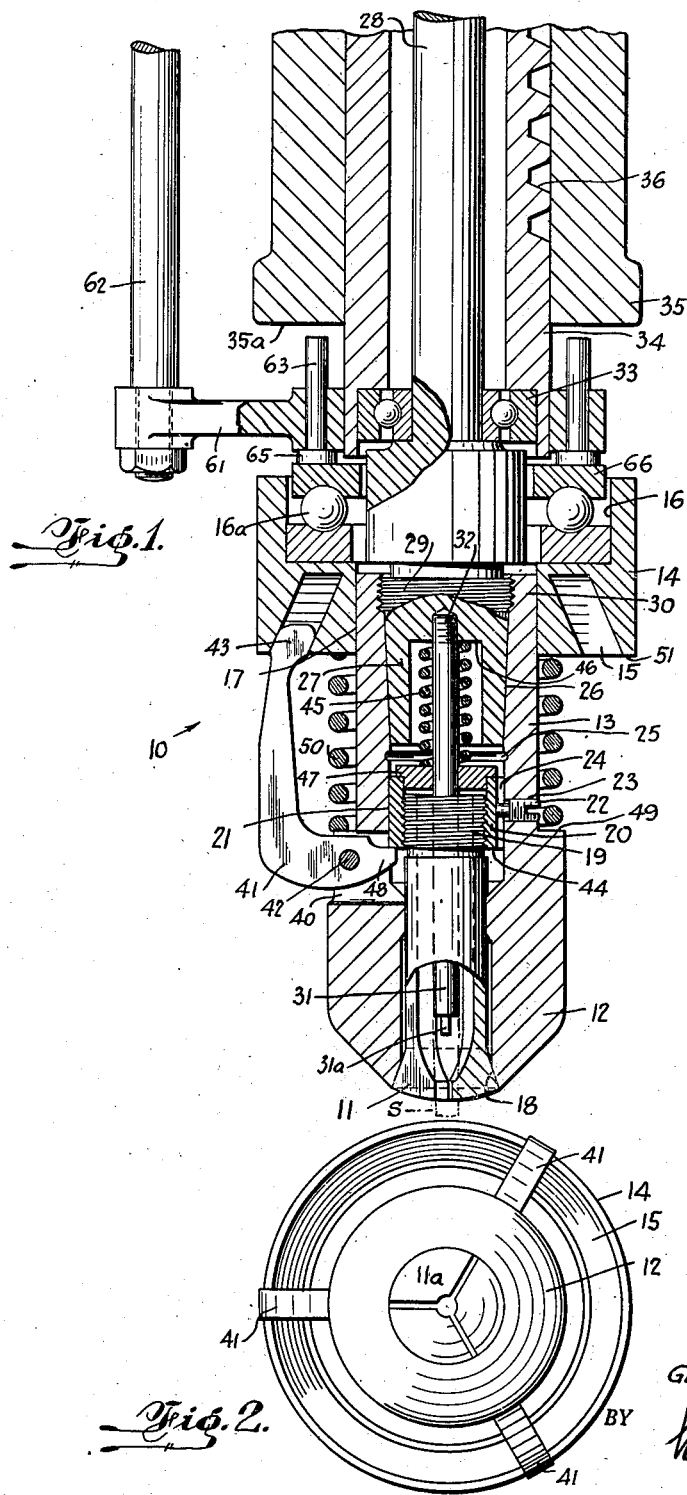
Fig. 1 is a vertical sectional view of the lower part of a chuck embodying features of this invention and shown in operative or clamping (closed) position.
Fig. 2 is a bottom view of the chuck as shown in Fig. 1.

Referring now more particularly to the drawings, there is illustrated a chuck device 10 comprising mainly the interchangeable collet 11 surrounded by head 12 which terminates into hollow reduced shank 13, on the outer surface of which is slidably mounted collar 14. Into the lower portion of the collar 14 there extends an inwardly converging circular groove 15, whereas on the upper portion of the collar 14 there is provided a recess 16 for receiving therein an antifriction bearing 16a. Shank 13 projects through the opening 17 into the collar 14. Head 12 has a bore provided at its lower end with tapered wall 18 against which bears the forward tapered end of collet 11. Collet 11 may be of conventional design, its upper end 19 being screwed into a sleeve 20 which, in turn, is slidably mounted within the opening 21 of shank 13. A set screw 22 threaded into the opening 23 of shank 13 engages a longitudinal groove 24 in sleeve or collar 20, thus providing for its rotation in unison with the head 12. The bore or opening 21 terminates in the groove 25, from where bore 26 upwardly extends, the bore or opening 26 being tapered and engaging the lower, hollow portion 27 of the spindle 28. The threaded portion 29 of the spindle 28 threadedly engages with the upper part 30 of shank 13. A pin 31 extending through collet 11 threadedly engages at 32 with the lower portion 27 of spindle 28 and forms at its forward end 31a an abutment, thus determining the depth for the insertion of the stock S to be worked upon. Pin 31 is, of course, interchangeable. The spindle 28 is connected by means of anti-friction bearings 33 to sleeve 34, sliding in the bearing 35 of the conventional machine.

Sleeve 34 is provided with a rack having teeth 36 suitably engaging a gear 37 to be turned by means of lever 38 for the purpose of raising or lowering the entire mechanism onto or away from the cutting or drilling tool (not shown). The head 12 is provided with a plurality of slots 40 (three being shown in this instance) in which there is fulcrumed lever 41 at 42. The upper portion of the lever 41 terminates in a guide piece or head 43 engaging the converging circular groove 15. The lower end 48 of lever 41 abuts against the bottom face 44 of slidable sleeve 20. A spring 45 presses against the inner wall 46 of the lower spindle portion 27, whereas its other end is urged against a cap 47 placed on the sleeve 20 and thus forces the bottom face or edge 44 of the sleeve 20 to always maintain contact with the lower end 48 of the lever 41. The head 12 at its juncture with the shank 13 forms a shoulder 49 against which rests the lower end of the helical spring 50 whose upper end engages the lower surface 51 of the collar 14. The head 12 is thus forced into its gripping and operative position, as shown in Fig. 1.

As seen in Fig. 4, a collar 60 is in fixed engagement with the sleeve 34. This collar 60 has an extending arm 61, which connects with the conventional shaft 62 which in turn is provided at its upper end with an up and down movement controlling device (not shown). A plurality of guide pins 63 project through opening 64 of collar 60. These pins 63 are provided with heads 65 resting on the upper race 66 of the anti-friction bearing 16a.

The operation of the chuck device is as follows: The change from the gripping or operative position of Fig. 1 into the release or inoperative position of Fig. 3 is achieved by raising sleeve 35 by means of a foot pedal or handle (in a conventional manner, not shown).

The spindle 28 is thus also raised, carrying with it the entire chuck unit 10 until the upper ends of pins 63 abut against the underface 35a of the bearing 35. The anti-friction bearing 16a and its collar 14 thus come to a stop; however, the spindle 28 continues to further move upwardly, causing shank 13 to upwardly slide within and along opening 17 of the now stopped collar 14, and also against action of spring 50. This upward movement of spindle 28 together with its lower spindle portion 27 and shank 13 connected thereto, allow spring 45 housed within the hollow of portion 27 to expand and to move relatively to shank 13, thereby downwardly pushing abutment plate 47 together with sleeve 20 within opening 21, thus causing shoulder 44 of said sleeve 20 to abut against and swing levers 41 about their pivots 42. Levers 41 will thus be forced upwardly into the converging circular groove 15 of collar 14, causing heads 43 of said levers 41 to enter groove 15, whereas the lower ends 48 of levers 41 are moved downwardly. Since sleeve 20 carries collet 11 secured thereto, the aforesaid downward movement thereof caused by spring 45 will result in projecting bottom portion 11a of the collet 11 beyond tapered wall 18. The jaws of the collet will then spread in the conventional manner (on account of the inherent spring action) and thus release the stock or work piece S worked upon.

A new work piece S may now be manually inserted, until it abuts against 31a, the spindle 28 is then again lowered by means of lever 38, thus reversing the aforesaid operation and causing the arms or levers 41 to move in downward and outward direction in groove 15, so that the lower ends 48 again press the collet 11 up into the hollow head 12.

The ratio of movement between collar 14 and sleeve or slide 20 may be about 8:1.

While there has been shown and described and pointed out the fundamental novel features of the invention as applied to the above embodiment, it will be understood that various omissions and substitutions and changes in the form and details of the device above described and illustrated and the operations thereof may be made by those skilled in the art without departing from the spirit of the invention.

Having thus described the invention what is claimed as new and desired to be secured by Letters Patent is:

1. A chuck device comprising a hollow head including a reduced shank provided with a bore, a spindle extending into and fixed to said shank, whereby said shank is movable with said spindle, the portion of said spindle fixed to said shank forming a housing having an open end, a helical spring placed in said housing, a collet positioned within said hollow head and adapted to project therebeyond, said collet having an extension guided in the bore of said shank, slide means within said shank to guide said extension therein and closing said open end of said housing, whereby said helical spring abuts against said slide means, a spring-supported collar movable on the outer surface of said shank, means operatively connecting said spindle with said collar, said collar having a converging circular groove, and a guide arm pivoted on said head and abutting with one of its ends against said slide means and extending with the other end into said groove, whereby upon movement of said collar by said spindle against action of its spring support and relatively to said shank, said other end of said guide arm will be retracted in said groove, while the one end thereof releases through said slide means said helical spring, thereby causing said collet to project beyond said head for feeding purposes.

2. A chuck device comprising a hollow head including a reduced shank provided with a bore, a helical spring supported in said bore, a collet slidably positioned within said hollow head and adapted to project beyond the forward end thereof for feeding purposes, said collet having an extension, slide means within said shank and connected to said extension to guide the same within said bore, said helical spring abutting against said slide means, a spring-supported collar movable on the outer surface of said shank and provided with an upwardly converging circular groove, and a guide arm pivoted on said head and contacting with one of its ends said slide means and extending with the other end into said groove, whereby upon movement of said collar on said shank and against action of its spring support said other end of said guide arm will be guided into said groove, while said one end is retracted to release the pressure of said helical spring against said slide means, thereby causing said collet to project beyond said forward end of said head.

3. A chuck device comprising a spindle provided with a recess in its lower end, a helical spring seated in said recess, a hollow head including a reduced shank upwardly extending from said head and fitted over said lower end of said spindle, a collar slidable on said shank and having an upwardly converging circular groove, a spring surrounding said shank and spacing said collar from said head, a plurality of levers adapted for reciprocal movement relatively to said groove and fulcrumed on said head, each lever being provided with a projection, a collet extending through said head and adapted to be advanced beyond the forward end of the latter feeding a work piece in said collet, means slidable within said shank and connected to said collet, one end of said slidable means abutting against said projections, the other end of said slidable means closing said recess and forming an abutment for said helical spring, whereby upon upward movement of said spindle relatively to said collar said levers will be moved into said groove, thereby releasing said helical spring, and causing said slidable means against said projections and forwardly moving said collet beyond said end of said head.

4. A chuck device comprising a spindle, a hollow head terminating in a hollow shank connecting one end of said spindle to said head, a collar arranged for slidable movement on the outer surface of said shank, a spring supporting said collar and disposed between the underface of said collar and said head, an upwardly tapering circular groove extending from the underface into said collar, means to move said shank against action of said spring relatively to said collar, slide means movably disposed in said hollow shank, a helical spring seated between said one end of said spindle and one end of said slide means, a clamp supported by said hollow head and projectable beyond the forward end of the latter for discharge and feeding purposes, said clamp being fixed to said slide means, and guide means pivoted on said head and extending between said groove and the other end of said slide means, whereby upon movement of said spindle in lengthwise direction and relatively to said collar said guide means will be pushed a predetermined distance into said groove of said collar, thereby releasing said helical spring by permitting said slide means to follow the movement of said guide means and to thus project said collet beyond said forward end of said head.

5. A chuck device comprising a head having a forward end and provided with a longitudinal bore and with a transverse opening, a hollow shank forming an extension of said head, a collet positioned for longitudinal sliding movement in said bore, a sleeve connected to said collet and slidable within the hollow of said shank, a ring member including a circular groove arranged to slide on the outer surface of said shank, a lever pivoted on said head and including an arm and a projection, said projection extending through said opening for contact with one end of said sleeve, a helical spring abutting against the other end of said sleeve to urge said one end against said projection, said arm extending into said circular groove of said ring member, and means for moving said ring member to slide relatively to said shank surface whereby said arm is guided in said groove and said sleeve slid against said projection by action of said helical spring thereby causing longitudinal sliding movement of said collet within the bore relatively to the forward end of said head.

6. A chuck device comprising a head having a forward end and provided with a longitudinal bore and with a transverse opening, a hollow shank forming a reduced extension of said head, a collet positioned for longitudinal sliding movement in said bore, a guiding element connected to said collet and slidable within the hollow of said shank, a ring member including a circular groove arranged to slide on the outer surface of said shank, a lever pivotally disposed adjacent said opening of said head and including an arm and a projection, said projection extending through said opening for contact with one end of said element, a helical spring abutting against the other end of said element to urge the same against said projection, said arm extending into said circular groove of said ring member, spring means positioned on said reduced extension to expand between said head and said ring member, and means for moving said ring member to slide relatively to said shank surface against the action of said spring means whereby said arm is guided in said groove and said sleeve slid against said projection by action of said helical spring thereby causing longitudinal sliding movement of said collet within the bore beyond the forward end of said head.

7. A chuck device comprising a head having a forward end and provided with a longitudinal bore and with a transverse opening, a hollow shank forming a reduced extension of said head, a collet positioned for longitudinal sliding movement in said bore, a guiding element connected to said collet and slidable within the hollow of said shank, a ring member including a circular groove arranged to slide on the outer surface of said shank, a lever pivotally disposed adjacent said opening of said head and including an arm and a projection, said projection extending through said opening for contact with one end of said element, a helical spring abutting against the other end of said element to urge the same against said projection, said arm extending into said circular groove of said ring member, spring means positioned on said reduced extension to expand between said head and said ring member, and means for moving said ring member to slide relatively to said shank surface against the action of said spring means whereby said arm is guided in said groove and said sleeve slid against said projection by action of said helical spring thereby causing longitudinal sliding movement of said collet within the bore beyond the forward end of said head, the force of said spring means being greater than that of said helical spring so as to retract said collet into its position within said bore upon release of said moving means.

8. A chuck device comprising a hollow head having a forward end and a reduced shank, a power driven spindle connected to said shank whereby said head is moved with said spindle, said head and said shank being provided with a bore, a collet positioned in said bore, slide means connected to said collet, means reciprocably guiding said slide means within said bore, whereby said collet may be moved to project beyond the forward end of said head, lever means pivoted on said head, a collar slidably disposed on said shank and provided with a converging circular groove, one end of said lever means extending into said groove of said collar, the opposite end of said lever means contacting said slide means, means maintaining contact of said opposite end of said lever means with said slide means, a coil spring in engagement with said collar and urging said one end of said lever means in the direction out of said groove and the opposite end of said lever means against said slide means for retracting said collet into said bore of said head, and means operatively connected to said spindle for moving said collar against the action of said spring relatively on said shank, whereby said one end of said lever means is retracted into said groove thereby permitting said slide means to follow said opposite end of said lever means so as to move said collet beyond the forward end of said head.

GEORGE JELLINEK.